(No Model.)  G. D. LEECHMAN.  2 Sheets—Sheet 1.
VELOCIPEDE.

No. 447,835. Patented Mar. 10, 1891.

WITNESSES:
Arthur M. Flack.
Ed. C. Hammond.

INVENTOR
George Douglas Leechman.
By his Attorney (No Model.) 2 Sheets—Sheet 2.
G. D. LEECHMAN.
VELOCIPEDE.
No. 447,835. Fig. 4 Patented Mar. 10, 1891.
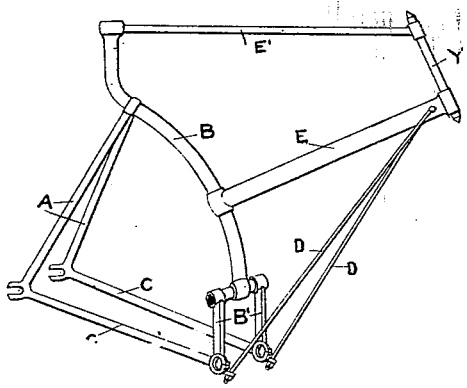
Fig. 5.
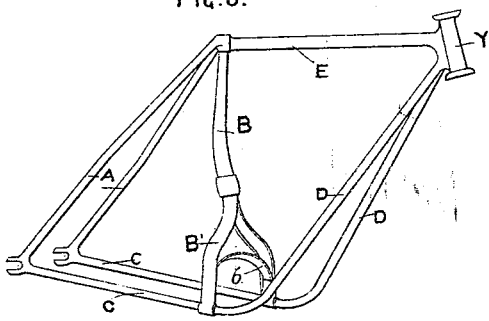
Fig. 6.
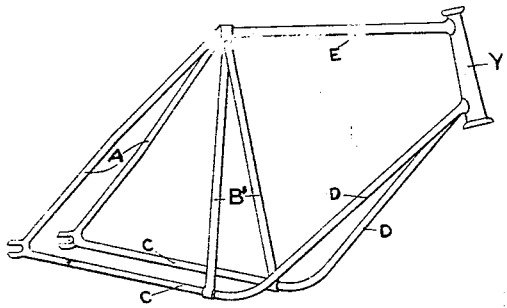
Fig. 7.
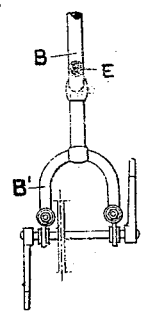
WITNESSES:
Arthur M. Flack
Ed. L. Hammond
INVENTOR.
George Douglas Leechman
By his Attorney.

UNITED STATES PATENT OFFICE.

GEORGE DOUGLAS LEECHMAN, OF LONDON, ENGLAND.

VELOCIPEDE.

SPECIFICATION forming part of Letters Patent No. 447,835, dated March 10, 1891.

Application filed September 8, 1890. Serial No. 364,233. (No model.) Patented in England December 5, 1887, No. 16,723.

*To all whom it may concern:*

Be it known that I, GEORGE DOUGLAS LEECHMAN, a subject of the Queen of Great Britain, residing at London, in the county of Middlesex, England, have invented a new and useful Improvement in the Frames of Velocipedes, (for which I have obtained a patent in Great Britain, No. 16,723, bearing date December 5, 1887,) of which the following is a specification.

My invention relates to improvements in the main frames of those velocipedes having a single rear driving-wheel, of which the Safety bicycle is a well-known type; and it has for its object increasing the strength and rigidity of the frame, more especially against the torsional strain thrown on it by the application of power to the pedal-crank axle.

With this end in view my invention consists in having a double-back fork or its equivalent adapted to form a triangle with the seat-pillar tube, in extending the members forming the equivalent of the lower fork beyond the seat-pillar tube to receive the bearings of the pedal-crank axle and carrying them up to the neck spindle or socket of the steering-head, and in forming an arch or its equivalent in the seat-pillar tube adapting the lower end of it to be attached to the prongs of the lower fork, thus enabling the driving-chain wheel to be mounted on the pedal-crank axle between the bearings of the said axle and within the members of the frame.

I carry my invention into practical effect in the manner shown in the accompanying drawings, in which—

Figure 1:
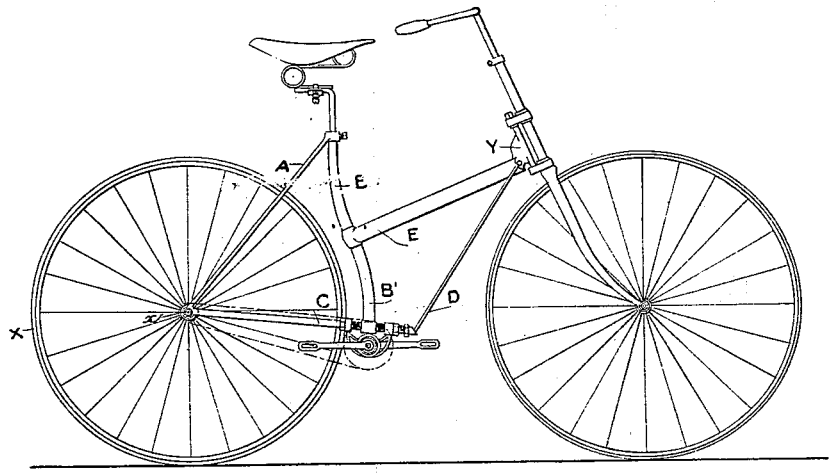
Figure 2:
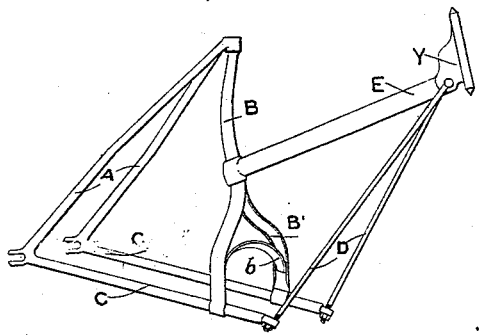
Figure 3:
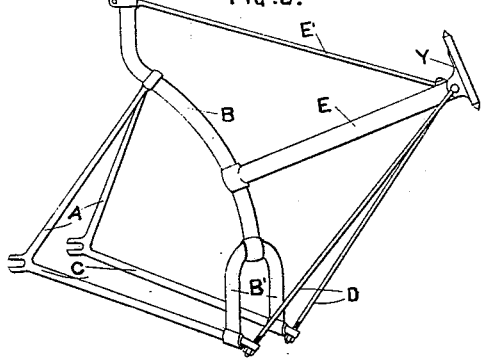

Figure 1, Sheet No. 1, is a view in side elevation of a rear-driving Safety bicycle fitted with my improved frame. Fig. 2, Sheet No. 1, is a view in perspective showing one form of my improved frame. Fig. 3, Sheet No. 1, and Figs. 4, 5, and 6, Sheet No. 2, are views in perspective showing other forms which my invention may assume; and Fig. 7, Sheet No. 2, is a view in end elevation showing the construction of the arch or fork supporting the lower fork.

Throughout the views similar parts are marked with like letters of reference.

The frame consists of a fork A, adapted to support the axle $x$ of the driving-wheel X at its forked end and to be attached to the seat-pillar tube B either at its upper extremity, as shown by Fig. 1, Sheet No. 1, of the accompanying drawings, or at a short distance therefrom, as shown by Fig. 3, Sheet No. 1, of the accompanying drawings. From the ends of the prongs of the fork A two members, forming a fork or its equivalent C, run horizontally or approximately horizontally forward and parallel or approximately parallel with each other.

The seat-pillar tube B is divided or otherwise fashioned or formed at its lower end to form an arch or fork B', adapting it to be fixed to the two members of the fork or its equivalent C. In Fig. 2, Sheet No. 1, of the accompanying drawings the lower end of the tube B is split to form the fork B and is stiffened by a bridge or stay $b$. In Fig. 3, Sheet No. 1, of the accompanying drawings the fork B' is formed out of a piece of tube bent into the required shape and brazed or otherwise fixed to the lower end of the tube B. In Fig. 4, Sheet No. 2, of the accompanying drawings the fork B' is formed of a cross-bar attached to the lower end of the tube B and having depending arms adapted to support the free ends of the members of the fork or its equivalent C. The forward ends of the members of the fork or its equivalent C are connected to the lower end of the neck spindle or socket of the steering-head Y, as the case may be, by two ties D D, which may take the form either of tension-rods, as shown by Figs. 1, 2, and 3, Sheet No. 1, and Fig. 4, Sheet No. 2, of the accompanying drawings, or of tubes, as shown by Figs. 5 and 6, Sheet No. 2, of the accompanying drawings, according to the desired shape of the frame. If the members D D take the form of tension-rods, they may be adjusted either at their points of connection to the members of the fork or its equivalent C or to the neck or socket Y, as found most convenient, and if they take the form of tubes they may either be extensions or continuations of the tubular members of the fork or its equivalent C, or they may be separate and fixed thereto or to the ends of the fork B' by brazing or otherwise. The remaining member of the frame connecting the neck spindle or socket Y with the back part of the frame consists of a single tube E, and it may either be carried to the tube B just above the fork B', as shown by Figs. 2 and 3, Sheet No. 1, and Fig. 4, Sheet No. 2, of the accompanying drawings, forming a semi-diamond-shaped frame; or to the top of the said tube B, as shown by Figs. 5 and 6, Sheet No. 2, of the accompanying drawings, forming a diamond-shaped frame.

When the frame is made of a diamond shape, the fork B' may extend from the members of the fork or its equivalent C to the junction of the fork A with the tube E and be formed of two tubes, as shown by Fig. 6, Sheet No. 2, of the accompanying drawings. When the frame is made of a semi-diamond shape and the top back fork does not run to the top of the seat-pillar tube, the said tube is braced by a stay or strut E' in the usual manner.

It will be seen that a frame constructed according to my invention is as rigid against torsional strain as it possibly could be, and it permits of the driving-chain wheel being placed within the members of the frame and between the bearings of the pedal-crank axle, thus spreading the said bearings as much as possible.

I would have it understood that I do not limit myself to the precise details of construction herein set forth and shown by the accompanying drawings, but hold myself at liberty to make such changes and alterations as fairly fall within the spirit and scope of my invention.

I am aware that diamond and semi-diamond shaped frames have already been made, and I therefore do not broadly claim such as my invention; but, Having now particularly described and ascertained the nature of my said invention and in what manner the same is to be performed, I declare that what I claim is—

1. In a frame for a single rear-driving velocipede supporting the forward ends of the members forming the equivalent of the lower back fork by a fork or arch formed on the seat-pillar tube, extending these members forward to carry the bearings for the pedal-crank axle, and connecting their forward ends to the neck spindle or socket by two ties, as and for the purpose set forth.

2. In a frame for a single rear-driving velocipede, the combination, with the double-back fork or its equivalent, of the seat-pillar tube forked or arched at its lower end to support the members of the lower back fork and adapted to receive the top back fork at any convenient position above the arch or fork, and of the two ties connecting the forward ends of the members of the lower back fork with the lower extremity of the neck spindle or socket, all combined, arranged, and operating as and for the purpose set forth.

3. In a frame for a single rear-driving velocipede, making those three members of the frame which converge at or about the pedal-crank axle double or forked through the whole or a portion of their lengths, enabling the driving-chain wheel to be mounted on the pedal-crank axle between the said members of the frame, as and for the purpose set forth.

4. In a frame for a single rear-driving velocipede, the combination of the top back fork A, of the seat-pillar tube B, having a fork B' fixed to or formed on or at its lower end and adapted to support the forward ends of the members of the lower back fork C, of the two ties D D, connecting the forward ends of the members of the said back fork with the lower end of the neck spindle or socket Y, and of the tube E, connecting the top of the neck spindle or socket with the seat-pillar B, all combined, arranged, and operating as set forth.

5. In a frame for a single rear-driving velocipede, the combination of the top back fork A, of the seat-pillar tube B, having a fork B' at its lower end adapted to support the members of the lower back fork C, of the extensions of the members of the said lower back fork running up to the lower end of the neck spindle or socket Y, and of the tube E, running from the neck spindle or socket to the top, or approximately so, of the seat-pillar B, all combined, arranged, and operating as set forth.

6. In a frame for a single rear-driving velocipede, the combination of the top back fork A, of the seat-pillar tube forked throughout the whole of its length and adapted at its lower ends to support the members of the lower back fork C, of the tie-tubes D D, running between the forward extremities of the members of the said lower back fork and the neck spindle or socket Y of the steering-head, and of the tube E, running between the neck spindle or socket Y of the steering-head and the junction of the top back fork A and the fork B', all combined, arranged and operating as set forth.

In witness whereof I have hereunto signed my name in the presence of two subscribing witnesses.

GEORGE DOUGLAS LEECHMAN.

Witnesses:
ARTHUR M. FLACK,
70 *Chancery Lane, W. C.*
JOSEPH LAKE,
17 *Gracechurch St., London, E. C.*